United States Patent [19]

Zhao et al.

[11] Patent Number: 6,036,999
[45] Date of Patent: Mar. 14, 2000

[54] METHOD OF PREPARING GRINDING MEDIA CONSISTING ESSENTIALLY OF SINTERED TIO$_2$ PARTICLES

[76] Inventors: Qian Qiu Zhao, 121 Cambridge Rd., Landenberg, Pa. 19350; David Allen Zimmerman, 15 Pheasant's Ridge N., Wilmington, Del. 19807

[21] Appl. No.: 08/887,552

[22] Filed: Jul. 3, 1997

[51] Int. Cl.[7] .............................. B05D 7/00; B05D 3/02; C23C 16/40
[52] U.S. Cl. ....................... 427/215; 427/242; 427/255.3; 427/376.2; 427/427; 106/436; 106/442
[58] Field of Search .................................... 427/212, 215, 427/242, 255.3, 427, 376.2, 365; 106/436, 442, 446, 450

[56] References Cited

U.S. PATENT DOCUMENTS

| | | | |
|---|---|---|---|
| Re. 27,818 | 11/1973 | Werner . | |
| 2,488,439 | 11/1949 | Schaumann . | |
| 2,559,638 | 7/1951 | Krehma et al. . | |
| 2,721,626 | 10/1955 | Rick . | |
| 3,767,455 | 10/1973 | Claridge et al. | 427/354 |
| 3,876,442 | 4/1975 | Thomas | 106/446 |
| 3,884,871 | 5/1975 | Herman et al. | 427/221 |
| 4,125,412 | 11/1978 | West . | |
| 4,222,789 | 9/1980 | Jacobson | 106/441 |
| 4,239,548 | 12/1980 | Barnard et al. | 106/439 |
| 4,357,170 | 11/1982 | Brand | 106/448 |
| 4,784,841 | 11/1988 | Hartmann et al. . | |
| 5,076,815 | 12/1991 | Kunz et al. | 501/134 |
| 5,175,132 | 12/1992 | Ketcham et al. | 501/103 |
| 5,266,108 | 11/1993 | Hauck . | |
| 5,356,470 | 10/1994 | Ott et al. . | |
| 5,554,216 | 9/1996 | Baidins et al. | 427/218 |
| 5,714,260 | 2/1998 | Okuda et al. | 427/215 |

FOREIGN PATENT DOCUMENTS

| | | |
|---|---|---|
| 0 469730 A1 | 5/1992 | European Pat. Off. . |
| 62-34779 | 2/1987 | Japan . |
| 64-83548 | 3/1989 | Japan . |
| 1024053 | 3/1966 | United Kingdom . |

OTHER PUBLICATIONS

Standard Test Method for Vickers Hardness of Metallic Materials, pp. 274–282, astm Designation E 92–82 Reapproved 1987.

Glen Mills, Inc, 395 Allwood Road, Clifton, NJ 07012, Titania–1 Data Sheet.

*Primary Examiner*—Michael Lusignan
*Assistant Examiner*—Bret Chen

[57] ABSTRACT

This invention relates to methods of preparing grinding media consisting essentially of sintered titanium dioxide (TiO$_2$) particles. The method involves preparing base TiO$_2$ particles, coating the base TiO$_2$ particles with at least one hydrous oxide, compressing the TiO$_2$ particles, and granulating the TiO$_2$ particles to form TiO$_2$ particles having substantially rounded edges. The invention further encompasses the resulting grinding media prepared by such methods and to methods of using such grinding media in media-milling particulate material such as titanium dioxide pigments.

15 Claims, No Drawings

METHOD OF PREPARING GRINDING MEDIA CONSISTING ESSENTIALLY OF SINTERED TIO₂ PARTICLES

BACKGROUND OF THE INVENTION

1. Field of the Invention

The present invention relates to methods of preparing grinding media consisting essentially of sintered titanium dioxide ($TiO_2$) particles and to the resulting grinding media produced by such methods. The invention further encompasses methods of using such grinding media in media mills for reducing the particle size of particulate material, particularly titanium dioxide pigments.

2. Description of the Related Art

Media-milling is an established technology for reducing the particle size of particulate material such as titanium dioxide ($TiO_2$), and media-milling equipment is commercially available. Typically, when $TiO_2$ particles are media-milled, a slurry of $TiO_2$ particles is fed into a grinding chamber charged with grinding media. The grinding media are stirred in the grinding chamber by a series of discs attached to a rotating shaft. The motion of the stirring discs and grinding media is perpendicular to the direction in which the slurry is pumped; thus, the $TiO_2$ particles are sheared by the media. A screen is often used to keep the grinding media inside the grinding chamber, while allowing the $TiO_2$ slurry to flow out of the mill. Media-milling may be performed with various types and shapes of grinding media such as beads, sand, or pebbles. Other examples of grinding media include particles of zirconium silicate, alumina, silicon carbide, silica, and zirconia. Often, the media-milling process is adjusted to provide a final product having the desired particle size, optics, durability, gloss, and dispersibility.

As discussed above, different types of grinding media are known. For example, Japanese Kokai Patent Application No. Sho 64 [1989]-83548 discloses a process to mix and crush at least two ceramic powders containing a titanium element (e.g., titania, titania plumbate) and a zirconium element (e.g., zirconia, zirconia plumbate) using precious stones composed of titanium dioxide and zirconium dioxide as media. Recognizing that abrasion of the media will occur, it is disclosed that using both titanium- and zirconium-containing media with ceramic powders containing a titanium element and a zirconium element reduces the variation in the ratio of Ti:Zr components in the ceramic powders which occurs from before and after crushing of the ceramic powders.

It is understood that commercially available grinding media from Glen Mills, Inc. (Clifton, N.J. 07012) is prepared by physically blending titania ($TiO_2$), alumina ($Al_2O_3$), and silica ($SiO_2$) particles. The final grinding media composition comprises 77.7 wt. % $TiO_2$, 17.4 wt. % $Al_2O_3$, and 4.6 wt. % $SiO_2$. The grinding media have a specific gravity of 3.9 g/cc, hardness of 1100 kgf/mm², compressive strength of 28 kgf/mm², and a packed density of 2.4 kg/l. The particle size of the media is described as being in the range of 0.8 mm–5.0 mm.

Also, calcined $TiO_2$ can be used as granular scrubs for removing $TiO_2$ deposits from the internal surfaces of cooling conduits. Rick, U.S. Pat. No. 2,721,626 discloses adding relatively dense, hard abrasive particles such as calcined, agglomerated titanium dioxide, silica, or sand into a cooling conduit containing a hot suspension of $TiO_2$ particulate material. It should be recognized that calcined $TiO_2$ scrubs are typically prepared by heating the $TiO_2$ particles to a maximum temperature of 1000° C., and the surface area of most of the $TiO_2$ particles is decreased by this heating step. The calcined $TiO_2$ scrubs are coarse and have a relatively large particle size in the range of 4 to 20 mesh (4750 to 850 microns) and are typically porous and fragile.

As discussed above, it is recognized that certain grinding media comprising $TiO_2$ particles are commercially available from Glen Mills, Inc. However, the process used to produce such grinding media is cost-intensive, since it involves making spherical particles from a physical mixture of titania, alumina, and silica. Further, these grinding media have a relatively high weight percentage of alumina which contributes to their having generally good wear-resistance properties.

One object of the present invention is to provide new methods for preparing grinding media consisting essentially of $TiO_2$ particles. Another object of this invention is to provide grinding media having good wear-resistance which contain a relatively low weight percentage of alumina. The present invention provides such methods and products prepared by these methods, along with methods for using such grinding media in media-milling operations.

SUMMARY OF THE INVENTION

The present invention provides a method of preparing grinding media consisting essentially of sintered $TiO_2$ particles, comprising the steps of: a) preparing base $TiO_2$ particles; b) coating the base $TiO_2$ particles with at least one hydrous oxide; c) compressing the coated $TiO_2$ particles; d) granulating the compressed $TiO_2$ particles to form $TiO_2$ particles having substantially rounded edges; and e) sintering the granulated $TiO_2$ particles to form grinding media consisting essentially of $TiO_2$ particles.

The base $TiO_2$ particles may be produced by a chloride or sulfate manufacturing process. Preferably, the hydrous oxide-coating comprises 3 to 20 wt. % of the coated $TiO_2$ particles based on total weight of the coated $TiO_2$ particles and is selected from the group consisting of alumina, silica, boria, zirconia, and mixtures thereof. Typically, the hydrous oxide-coated $TiO_2$ particles are filtered, dried, milled, and classified. In one preferred embodiment, the hydrous oxide coating comprises 3 to 12 wt. % alumina. In another preferred embodiment, the hydrous oxide coating comprises 3 to 12 wt. % alumina and 1 to 10 wt. % silica.

Preferably, the granulated $TiO_2$ particles are sintered at a temperature within the range of 1200° C. to 1500° C. The grinding media of this invention consists essentially of sintered $TiO_2$ particles, but may contain other particles such as, for example, those selected from the group consisting of sand, zirconium silicate, alumina, silicon carbide, silica, zirconia, and mixtures thereof.

The grinding media prepared by the method of this invention preferably contain sintered $TiO_2$ particles having an average size within the range of 50 to 5000 microns, a specific gravity of 2.9 to 4.3 g/cc, a bulk density of 1.7 to 2.6 kg/l, and a Vickers hardness of 800 to 1200 kg/mm².

This invention also provides a method of using the grinding media to media-mill particulate material, comprising the steps of: a) dispersing particulate material in a liquid medium to provide a milling slurry; b) introducing the grinding media into a media mill; c) introducing the milling slurry into the media mill containing the grinding media, and d) milling the particulate material. The particulate material is preferably a pigment and is more preferably titanium dioxide pigment.

DETAILED DESCRIPTION OF THE INVENTION

The present invention provides new methods for producing grinding media consisting essentially of sintered $TiO_2$ particles, the resulting grinding media products, and methods for using the grinding media to reduce the particle size of particulate material, such as pigments, in a media-milling operation.

The present invention provides a method for preparing $TiO_2$-based grinding media using base $TiO_2$ particles produced from conventional $TiO_2$ processes. The $TiO_2$ particles used to prepare the grinding media of this invention can be base $TiO_2$ particles produced by the well known chloride or sulfate manufacturing processes. By "base $TiO_2$ particles produced by the chloride manufacturing process", it is meant $TiO_2$ particles directly removed from oxidizing $TiCl_4$ and before any finishing steps and/or before any surface treatments are applied. By "base $TiO_2$ particles produced by the sulfate manufacturing process", it is meant $TiO_2$ particles before any surface treatments are applied. Base $TiO_2$ particles are further described in Ott and Sullivan, U.S. Pat. No. 5,356,470.

The base $TiO_2$ particles used to prepare the grinding media of this invention are then subjected to surface-treatment with hydrous oxides such as alumina, silica, boria, zirconia, and the like or mixtures of these materials. Conventional coating processes can be used to surface-treat the particles, such as those described in Werner, U.S. Pat. Re. 27,818 and West, U.S. Pat. No. 4,125,412, the disclosures of which are hereby incorporated by reference. Preferably, the hydrous oxide-coating comprises 3 to 20 wt. % of the coated $TiO_2$ particles based on total weight of the coated $TiO_2$ particles. In one preferred embodiment, the hydrous oxide-coating comprises 3 to 12 wt. % alumina. In another preferred embodiment, the hydrous oxide-coating comprises 3 to 12 wt. % alumina and 1 to 10 wt. % silica.

The $TiO_2$ particles which have been surface treated with hydrous oxides, especially with alumina and silica, are then typically filtered, dried, wet or dry-milled, and classified by conventional techniques such as screening or sieving.

The coated $TiO_2$ particles are then compressed by subjecting the particles to pressure by any suitable means which may include a high pressure agglomeration process. The objective of compressing the particles is to make densified briquettes. Mechanical means, such as, but not limited to, pressure rolls and presses are preferred for compressing the particles. However, other means such as fluid bed granulators, extruders, high shear mixers, pan granulators or spray dryers can be used so long as high density agglomerates are produced.

One preferred means of compressing the coated $TiO_2$ particles is to feed the titanium dioxide pigment into counter-rotating, opposing pressure rolls. If desired, the rolls can have depressions on their surfaces which can aid in the formation of the compressed particles. The feed to the rolls can be accomplished by any suitable means, including but not limited to, a screw feeder which also compacts and forces air from the pigment particles. Another specific means is to feed the pigment particles to a mechanical press which subjects the particles to the required amount of pressure. If desired, either the moving face of the press, the plate which the face of the press will exert pressure on, or both, can have depressions on their surfaces which aid in the formation of the compacted pigment particles.

Ordinarily, the compression operation will be carried out at ambient temperature. However, the compression operation can be carried out at any temperature up to that which would calcine, sinter or fuse the pigment, e.g., less than about 500° C. The pressure necessary to form acceptable compressed titanium dioxide useful for this invention can vary considerably depending, for example, on the nature of the pigment being used. It has been found, however, that for many applications good quality compressed titanium dioxide particles can be made by using pressure rolls which exert a pressure of at least 10,000 pounds per linear inch and preferably at least 20,000 pounds per linear inch.

The compressed $TiO_2$ agglomerates are then granulated to reduce the size of the particles and to form substantially rounded edges on the particles. The granulation step is conducted in a hammer mill or screen mill or the like; or further granulated, for example, in an oscillating generator and then sieved, screened or otherwise classified to provide a narrow particle size distribution. Optionally, the particles may be introduced into a tumbling mixer to further round any sharp edges of the agglomerates which may be substantially irregular in shape. Alternatively, the compaction, granulation and rounding steps can be integrated into a single closed process with internal circulation of coarse and fine material.

The granulated $TiO_2$ particles are heated to a temperature of 1200° C. to 1500° C. The granulated $TiO_2$ particles should be heated for at least 30 minutes at or above 1200° C. to achieve sintering of the $TiO_2$ particles. By "sintering", it is meant the fusion of $TiO_2$ particles at a temperature below their melting point such that a decrease in surface area of the particles is achieved. The sintering can be run batchwise or continuously. For batch sintering, any type of fixed vessel such as a boat or tube can be used. Alternatively, a continuous rotary calciner can be used to achieve simultaneously sintering and rounding of the granulated $TiO_2$ particles.

The grinding media prepared by the method of this invention preferably contain sintered $TiO_2$ particles having an average size within the range of 50 to 5000 microns, preferably from 600 to 1000 microns, a specific gravity of 2.9 to 4.3 g/cc, a bulk density of 1.7 to 2.6 kg/l, and a Vickers hardness of 800 to 1200 kg/mm$^2$. This density is suited for milling of high solid concentration slurries. The grinding media have excellent wear-resistance when used in milling applications.

The grinding media of this invention can be used in numerous grinding, milling, and dispersing applications. The grinding media are particularly useful in milling particulate materials. Examples of particulate material which can be milled include, but are not limited to, ores and minerals, clays, coal, ceramics, pigments, phosphates, fertilizers, grains, and pharmaceuticals. It is especially desirable to use the milling process of this invention to media mill pigments, especially white pigments, with $TiO_2$ pigment being especially preferred. The $TiO_2$ pigments, suitable for media-milling, may or may not have coatings of hydrous metal oxides. One advantage with using the grinding media of this invention to media mill $TiO_2$ pigments is that foreign material which may adversely affect the pigment properties is not introduced into the pigment during the media-milling process.

Media-milling devices can include for example, horizontal media mills, sand mills, disc mills, cage mills, and/or attrition mills and the like. Horizontal media mills and sand mills are preferred for the grinding media of this invention.

The particulate material, to be milled, is dispersed in a liquid medium which can be aqueous or organic, in the presence or absence of dispersants and/or grinding aids to provide a milling slurry. When the particulate material is $TiO_2$, the liquid medium is preferably water. Common dispersants and/or grinding aids for use with aqueous dispersions of $TiO_2$ include polyols, alkanol amines, and the like.

The milling slurry can then be introduced into the grinding chamber of the mill or pre-mixed with the grinding media and then introduced into the mill. Preferably, the milling slurry is introduced into the grinding chamber after the grinding media have been added and while they are being stirred. The slurry is milled by the grinding media acting on the particulate material. The stirring of the grinding media is preferably in a motion perpendicular to the direction in which the slurry is introduced so that the particulate material is sheared by the grinding media. Typically, a screen keeps the grinding media inside the grinding chamber but allows the milled slurry out of the mill. Optionally, the milled slurry can be further screened.

It should be recognized that the grinding media of this invention can be used in operations other than media-milling particulate material. For example, the grinding media can be used as fluid bed media, e.g., in $AlCl_3$ generators, as abrasives or sand blasting material for surface polishing, and as scrubbing solids in $TiO_2$ oxidation reactions.

The present invention is further illustrated by the following Examples, but these Examples should not be considered as limiting the scope of invention.

EXAMPLES

Example 1

$TiO_2$ pigment was prepared by oxidizing TiCl4 in accordance with Schaumann, U.S. Pat. No. 2,488,439 and Krchma, U.S. Pat. No. 2,559,638. The $TiO_2$ pigment was treated so to achieve surface coatings of about 10% silica and 8% alumina according to known techniques. The coated $TiO_2$ was filtered, dried, and ground.

The collected $TiO_2$ was fed into a Bepex Corporation model MS-60 roll compaction machine and treated as described in Hauck, U.S. Pat. No. 5,266,108, the disclosure of which is hereby incorporated by reference. The rolls exerted a pressure on the $TiO_2$ particles of about 30,000 pounds per linear inch of roll width. After exiting the rolls, the compressed $TiO_2$ particles were granulated using a Stokes granulator.

The granulated $TiO_2$ particles were sintered by heating to 1300° C. for one hour to provide $TiO_2$ grinding media having a particle size distribution of 300–3000 microns, a specific gravity of 3.93 g/cc, a bulk density of 2.4 kg/l, and a Vickers hardness of 1100 kg/mm².

The $TiO_2$ grinding media prepared, as described above, were used to media mill a $TiO_2$ pigment. The comparative samples included one sample which used commercial zirconium silicate (available from SEPR Ceramic Beads and Powders, Mountainside, N.J. 07092 USA) as the grinding media, and another sample of $TiO_2$ pigment which was not media-milled. The results are shown below in Table 1.

TABLE 1

| Sample | Grit (a) | PS-D50 (b) | CT (c) | L*(d) |
|---|---|---|---|---|
| Non-milled $TiO_2$ Feed | 0.031 | 0.44 | 27.6 | 99.76 |
| $TiO_2$ Feed Ground with $ZrSiO_4$ | 0.004 | 0.42 | 22.0 | 99.36 |

TABLE 1-continued

| Sample | Grit (a) | PS-D50 (b) | CT (c) | L*(d) |
|---|---|---|---|---|
| $TiO_2$ Feed Ground with $TiO_2$ | 0.005 | 0.42 | 23.0 | 99.17 |

(a) Grit = weight fraction of particles greater than 325 mesh.
(b) Average particle size in microns as determined by a Horiba LA-900 laser-scattering particle size analyzer (available from Horiba Instruments, Inc., Irvine, California).
(c) Coarse tail = percent of particles having a diameter size greater than 0.6 microns as measured by the Horiba LA-900.
(d)L* refers to the lightness or darkness of the sample, with 100 being very light and zero being very dark. L* is measured using a Hunter instrument (available from Hunter Associates Laboratory, Inc., of Reston, Virginia) and a CIELab scale is used with a D65 illuminant, at a 2 degree observer angle.

From Table 1, it can be seen that the $TiO_2$ grinding media of this invention performed essentially the same as commercially available zirconium silicate grinding media.

Example 2

$TiO_2$ particles prepared, as described in Example 1, and having a size of 1000 to 1400 microns were used as grinding media in a Fritsch planetary mill to grind coarse $TiO_2$ particles. 100 g of $TiO_2$ grinding media were mixed with 100 g of coarse $TiO_2$ particles in water. The Fritsch mill was operated at full speed which generated about 50 G. A series of runs was made as shown in Table 2. Particle size distribution was measured using a Microtrac laser-scattering particle size analyzer (available from Honeywell, Fort Washington, Pa.). The starting TiO2 feed had a bimodal particle size distribution with a coarse mode about 100 microns in size and the finer mode about 0.25 microns in size.

TABLE 2

| | Percentage of Particles Having Particle Size Less Than Listed Particle Size | | |
|---|---|---|---|
| | 10% | 50% | 90% |
| Sample | Particle Size, (microns) | | |
| Feed | 0.299 | 0.572 | 133.6 |
| 2 minutes | 0.268 | 0.450 | 76.31 |
| 4 minutes | 0.243 | 0.436 | 83.82 |
| 8 minutes | 0.266 | 0.424 | 41.92 |
| 16 minutes | 0.197 | 0.367 | 1.217 |
| 32 minutes | 0.299 | 0.426 | 0.746 |
| 64 minutes | 0.211 | 0.406 | 0.758 |

Table 2 shows the coarse mode of the starting $TiO_2$ feed was gradually ground to pigmentary size. For example, the data provide that in the feed, 10% of the particles were less than 0.299 micron in size. At 8 minutes grinding time, 50% of the particles were less than 0.424 micron in size. At 64 minutes of grinding time, 90% of the particles were less than 0.758 micron in size. After 64 minutes of grinding, a single mode distribution was obtained. The $TiO_2$ grinding media were collected after grinding with no weight loss.

Example 3

The $TiO_2$ grinding media of Example 1 having a size range of 600–1400 microns, average size 930 microns, were charged to a 500-liter horizontal media mill and used to mill a $TiO_2$ slurry. A parallel process was run using a different mill with zirconium silicate (commercially-available from SEPR) as the grinding media. Results of the comparison are shown below in Table 3.

TABLE 3

| Media | * d16 | d50 | d84 | mean |
|---|---|---|---|---|
| $ZrSiO_4$ | 1.439 | 0.856 | 0.466 | 0.957 |
| $TiO_2$ | 1.568 | 0.966 | 0.534 | 1.063 |

* d16—16% of the particles had a greater particle size than the listed particle size.
d50—50% of the particles had a greater particle size than the listed particle size.
d84—84% of the particles had a greater particle size than the listed particle size.
mean—integral of particle mass multiplying the particle size frequency.

The results in Table 3 show very similar grinding abilities of the $TiO_2$ grinding media of this invention versus commercial zirconium silicate grinding media. In addition, similar wear rates of the different grinding media were observed.

We claim:

1. A method of preparing grinding media consisting essentially of sintered $TiO_2$ particles, comprising the steps of:
   a) preparing base $TiO_2$ particles;
   b) coating the base $TiO_2$ particles with at least one hydrous oxide and drying the coated $TiO_2$ particles;
   c) compressing the coated $TiO_2$ particles to form densified $TiO_2$ briquettes;
   d) granulating and rounding the densified $TiO_2$ briquettes to form $TiO_2$ particles having substantially rounded edges; and
   e) sintering the $TiO_2$ particles to form grinding media consisting essentially of sintered $TiO_2$ particles.

2. The method of claim 1, wherein the base $TiO_2$ particles are prepared by a chloride manufacturing process.

3. The method of claim 1, wherein the base $TiO_2$ particles are prepared by a sulfate manufacturing process.

4. The method of claim 1, wherein the hydrous oxide coating comprises 3 to 20 wt. % of the coated $TiO_2$ particles based on total weight of the coated $TiO_2$ particles.

5. The method of claim 4, wherein the hydrous oxide is selected from the group consisting of alumina, silica, boria, zirconia, and mixtures thereof.

6. The method of claim 5, wherein the hydrous oxide coating comprises 3 to 12 wt. % alumina.

7. The method of claim 5, wherein the hydrous oxide coating comprises 3 to 12 wt. % alumina and 1 to 10 wt. % silica.

8. The method of claim 1, wherein the hydrous oxide coated $TiO_2$ particles are filtered, dried, milled, and classified.

9. The method of claim 1, wherein the granulated $TiO_2$ particles are sintered at a temperature within the range of 1200° C. to 1500° C.

10. The method of claim 1, wherein the grinding media prepared by the method contain, in addition to the sintered $TiO_2$ particles, particles selected from the group consisting of sand, zirconium silicate, alumina, silicon carbide, silica, zirconia, and mixtures thereof.

11. A method of using the grinding media prepared by the process of claim 1 to media mill particulate material, comprising the steps of:
   a) dispersing a particulate material in a liquid medium to provide a milling slurry;
   b) introducing the grinding media into a media mill;
   c) introducing the milling slurry into the media mill containing the grinding media, and
   d) milling the particulate material.

12. The method of claim 11, wherein the particulate material is pigment.

13. The method of claim 12, wherein the particulate material is titanium dioxide pigment.

14. The method of claim 1, wherein the sintered $TiO_2$ particles have an average particle size within the range of 50 to 5000 microns.

15. The method of claim 1, wherein the sintered $TiO_2$ particles have a Vickers hardness of 800 to 1200 $kg/mm^2$.

* * * * *